May 30, 1950 H. A. BERNREUTER 2,509,415
ELECTRIC METER CASING
Filed Nov. 17, 1947 3 Sheets-Sheet 1
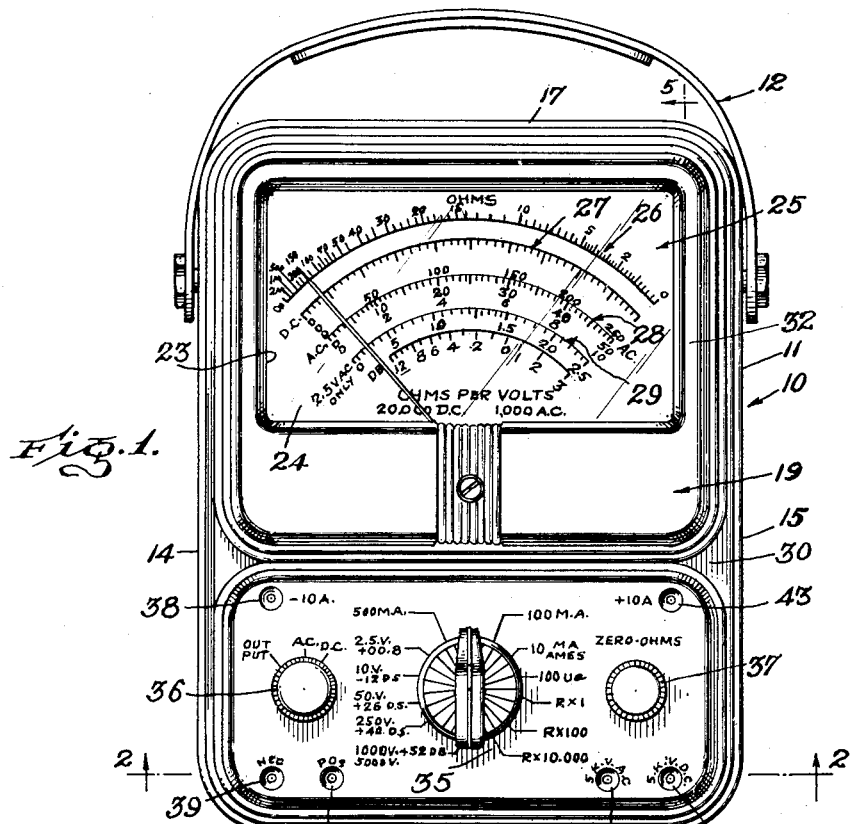
Inventor
Herbert A. Bernreuter
BY Robert H. Wendt
Attorney.

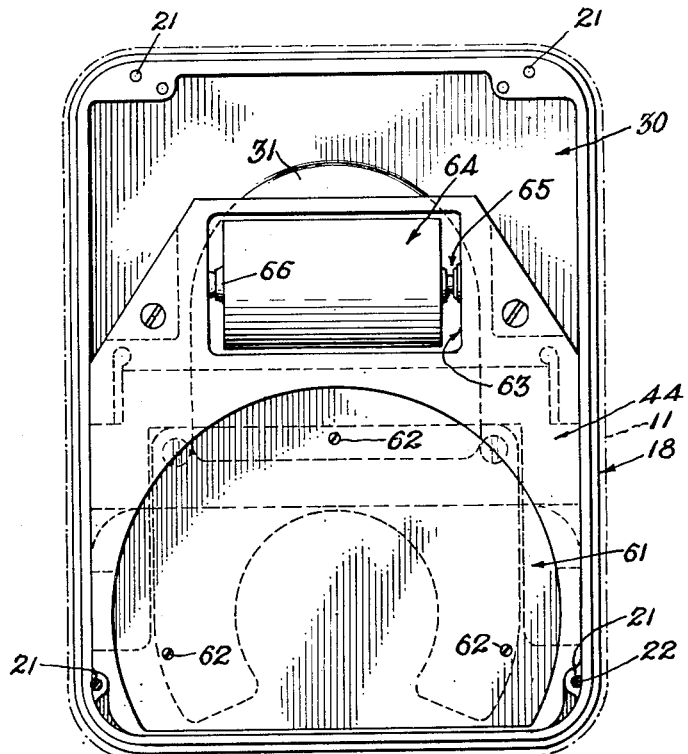
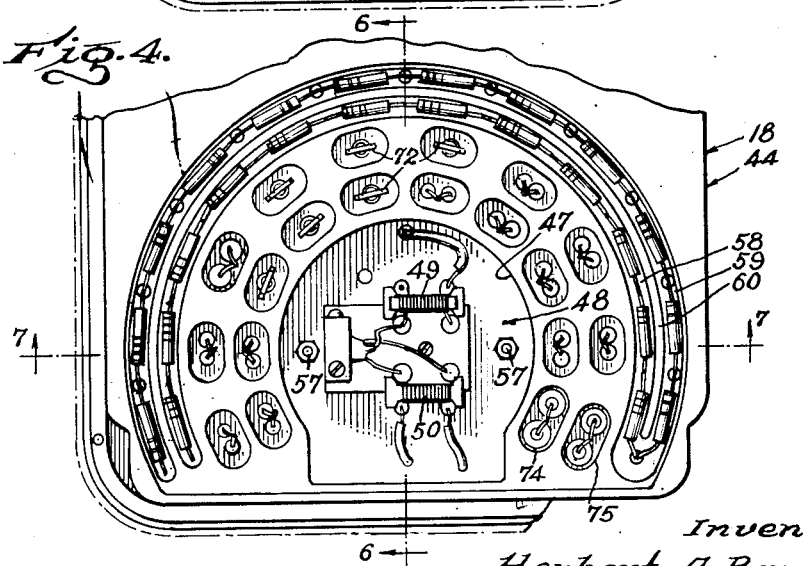

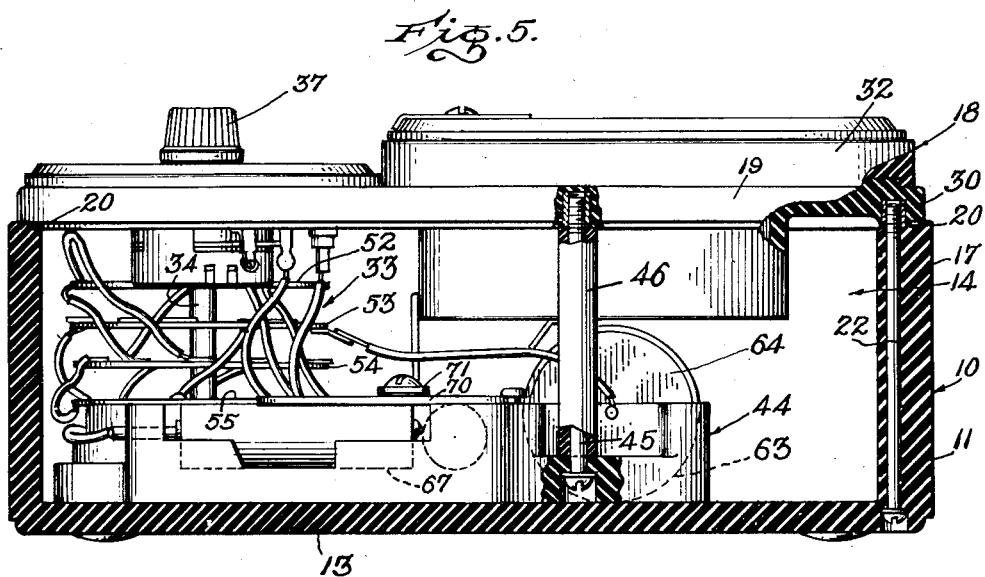
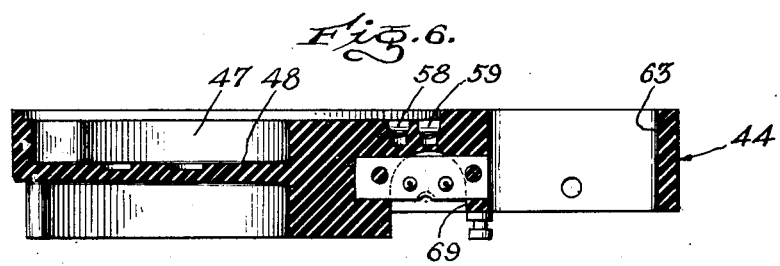
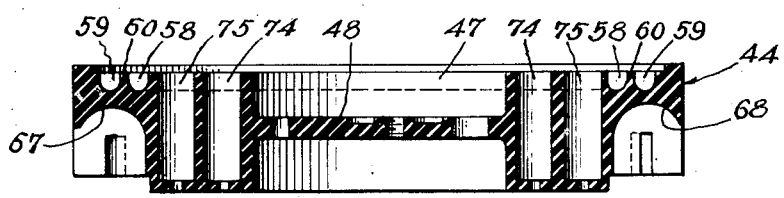

Patented May 30, 1950

2,509,415

UNITED STATES PATENT OFFICE 2,509,415

ELECTRIC METER CASING

Herbert A. Bernreuter, Chicago, Ill., assignor to Simpson Electric Company, Chicago, Ill., a corporation of Illinois Application November 17, 1947, Serial No. 786,528

4 Claims. (Cl. 171—95)

1

The present invention relates to electric meters, and is particularly concerned with meters of the type adapted to have a plurality of ranges, a multiplicity of different uses, and adapted to be used to make measurements of A. C. and D. C. current, voltage, and output, as well as resistance and other electrical units.

Such devices require the use of a plurality of electrical units comprising resistances, inductances, and capacitances, of pre-determined value, which it has been customary to mount upon a fibre supporting panel, adjacent a switch which is adapted to connect these units in circuit with the meter movement selectively to accomplish the measurements desired, which also involves the use of a multiplicity of insulated conductors, various of which may be bound together in cables, presenting a very complex system of wiring on the back of the panel.

Such arrangements of the prior art are difficult to assemble, they utilize long leads of various characteristics, they present problems of insulation and current leakage, possible short circuit, and change of position of the parts due to a jolt or jar.

One of the objects of the present invention is the provision of an improved instrument assembly of the class described, comprising a meter movement, a rotary switch, and a multiplicity of other electrical units, so mounted that the length of leads is reduced to a minimum, each electrical unit is firmly housed and secured in a suitable socket, there is no need for elongated cables, and there is no possibility of change of position due to jar, nor any possibility of short circuit or current leakage.

Another object is the provision of an improved electric meter assembly of the class described, which is provided with a molded insulating subpanel, adapted to support a rotary switch in a central position, with respect to a multiplicity of sockets in the panel, so that the units of electrical resistance, inductance, or capacitance may be mounted, each in its socket, with relatively short, direct leads, passing down through the insulation of the panel to the switch contacts, thus eliminating the necessity for the unsightly and inefficient long leads and cables of the prior art.

Another object is the provision of such an instrument assembly, which is simple, efficient, sturdy, capable of being manufactured at a low cost, easy to assemble, and adapted to be used for a long period of time without necessity for repair or replacement of any of its parts.

2

Other objects and advantages of the invention will be apparent from the following description and the accompanying drawings, in which similar characters of reference indicate similar parts throughout the several views.

Referring to the three sheets of drawings,

Fig. 1 is a top plan view of the face of an electric meter embodying the invention;

Fig. 2 is a sectional view, taken on the plane of the line 2—2 of Fig. 1, looking in the direction of the arrows;

Fig. 3 is a rear elevational view, showing the rear of the subpanel, as it appears when it is removed from the housing;

Fig. 4 is a fragmentary elevational view of the same subpanel, with the partially circular cover removed, which may be seen at the bottom of Fig. 3;

Fig. 5, is another transverse sectional view, taken on the plane of the line 5—5 of Fig 1, looking in the direction of the arrows;

Fig. 6 is a sectional view, taken through the subpanel alone on the plane of the line 6—6 of Fig. 4, looking in the direction of the arrows; and Fig. 7 is another similar sectional view, taken through the subpanel alone, on the plane of the line 7—7 of Fig. 4, looking in the direction of the arrows.

Referring to Fig. 1, 10 indicates in its entirety, the electric meter, mounted in a housing 11, and provided with a strap handle 12. The housing 11 is preferably constructed of a phenolic condensation compound, which may be molded, and it is provided with a bottom 13, integrally joined and formed with side walls 14, 15, and end walls 16, 17 all of which are rectangular in form, the housing being open at the top.

The rectangular housing 11 is adapted to receive a meter unit 18 which may be mounted upon a face plate 19 of sufficient size to cover the open end of the housing 11 and close the housing. The upper edges of the housing walls are preferably provided with a rabbetted recess 20, and the lower side of the face plate 19 is formed complementarily so that a dust-tight seal is effected at the joint between face plate 19 and housing 11.

Face plate 19 is provided on its rear side with a plurality of threaded metal members 21 embedded in and molded in the face plate, and adapted to receive the screw bolts 22, Fig. 5, which pass through from the back of the housing and are threaded into the threaded members 21 to secure the housing and face plate together.

Face plate 19 is provided on its front with an opening 23 closed by means of a glass window 24, and exposing to view a dial 25 with indicia and scale divisions for the various measurements intended to be made by the instruments. For example, the uppermost indicia 26 is in ohms from 0 to 2 megohms for measurement of resistance. The next scale divisions 27 bear indicia for D. C. measurements from 0 to 250, 0 to 50 and 0 to 10 in volts. The next scale divisions 28 bear indicia for A. C. measurement from 0 to 250 and 0 to 50 volts A. C., and the next scale divisions 29 bear indicia from 0 to 2.5 volts A. C. only.

The lowermost scale divisions are from −12 to +3 db. The cover plate 18 comprises a rectangular base 30 which is formed with a cylindrical cup-shaped member 31 for receiving the meter movement, and it also includes an upwardly projecting window frame 32 which is secured to the base 30 by screw bolts.

A rotary switch 33 having shaft 34 and actuating knob 35 is secured to the base 30 with a switch depending below the base, and the face of the cover plate 18 bears suitable indicia for the indicating knob 35 for indicating the condition of the circuit at any point of adjustment of the knob.

Another switch knob 36 is provided for adjustment of the circuit for measurement of output or for measurement of A. C. or D. C. voltage. Another knob 37 is provided at the right for a switch for resistance measurements. Apertures are provided in the face plate at 38—43 for permitting conductor jacks of various leads to be inserted and connected to the circuit.

In the devices of the prior art an instrument of this nature has its back provided with a multiplicity of conductors, some of which are tied together as cables, and others of which extend loosely in various directions, being connected to various condensers, inductances, resistance coils, etc., which are mounted upon a fibre board.

The present invention is distinguished by the mounting of all of the resistance coils and other electrical units in the sockets of a molded insulating mounting unit indicated at 44, and shown in Figs. 3 to 7. Such an insulating mounting unit may be molded of a phenolic condensation compound, and it is preferably so proportioned and shaped and has its sockets so located that the length of leads is reduced to a minimum. The insulating mounting unit 44 may be secured to the cover plate 18 by a plurality of screw bolts 45 passing through tubular spaces 46 and threaded into metallic threaded members embedded in the base 30.

The molded insulating mounting unit, Figs. 4, 6 and 7, is preferably formed on its top with a circular recess having a cylindrical wall 47, and the flat bottom of this recess may serve as a mounting for a plurality of electrical units 49, 50 and 51.

The switch unit may be of the type covered by the prior patent issued to Ray Simpson, No. 2,447,718, on August 24, 1948, for rotary switches, and the fibre plates 52, 53, 54, 55, which carry fixed contacts arranged in circles, are secured together by means of spacers 56 and screw bolts 57, Fig. 4, the bolts also passing through the insulating mounting unit 44 to which they secure the switch.

Surrounding the central recess 47 the molded mounting unit 44 has two rows of oval recesses or bores 48 and 49, these bores being long enough to receive the standard resistance units which are used as multipliers and for other purposes with an electrical measuring instrument.

Some of the oval bores 48 may contain fibre plates 50 which are wound with a predetermined number of turns of insulated wire used as multipliers, etc., and others of the oval bores 48, 49 may contain and house porcelain resistance units, two of which may be seen joined together in series in each of the bores 48, 49 at the right of Fig. 4.

The end of each of the bores 48, 49 is formed with spaced apertures for passing the leads from the resistance units or other electrical units, and thus leads are located about the rotary switch in position to be directly connected to the fixed contacts of the rotary switch with a minimum length of lead.

The electrical units are all housed in sockets and insulated from each other, and the leads are all housed in bores and held spaced from each other so that they are better insulated and protected against shifting which might cause short circuit.

Outside of the oval sockets 48, 49 there are two partially annular grooves 58, 59 separated by an insulating rib 60. These grooves 58, 59 are used as sockets for a multiplicity of small electrical resistance units in series. The entire assembly of recess 47, sockets 48, 49 and grooves 58, 59 is covered by an insulating plate 61 of partially circular form secured in place by screw bolts 62 threaded into the insulation of the mounting unit 44.

In addition to the sockets, as aforesaid, there may be a rectangular recess 63, Fig. 3, for receiving the standard dry cell 64, this recess 63 having resilient plunger contact 65 at one end, and a fixed contact 66 at the other for placing the battery in circuit and holding the battery in the recess 63.

Other recesses 67 and 68, Fig. 7, are located on the lower outer edges at each side of the insulating mounting unit 44 for receiving the smaller pencil size batteries. There are two other upwardly extending grooves 69 located parallel to the recess 63, which grooves 69 are adapted to receive additional pencil size dry batteries, all the sockets being provided with fixed contacts and plunger contacts.

Referring to Fig. 2, these batteries are held in place, in each case, by an axle-shaped insulating plate 70 which is engaged by a spring finger 71 carried by the mounting unit 44. It will be noted that there are no loose cables which have to be bound together, and which provide leads of uncertain length for different resistance units or other electrical units.

All of the electrical units may have leads of substantially the same length, and the leads pass up directly from the electrical units in their sockets to the rotary switch.

It will thus be observed that accuracy may be increased by having all the leads of the same minimum length, and there is less possibility of short circuit or shifting of the parts since all electrical parts are housed in suitable sockets concentrically arranged about the rotary switch.

The present construction is simple, efficient, sturdy, capable of being manufactured at a low cost, and easy to assemble as the sockets hold the electrical units in place, and the apertures from the sockets hold the leads in place while they are being soldered. There is practically no possibility of a change of position of any of the parts due to jar, nor any possibility of short circuit or current leakage.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In an electrical measuring instrument, the combination of a cover plate with an instrument movement carried on the rear side of the cover plate and having a pointer and dial visible through the plate, with a supporting unit of molded insulating material of generally circular shape, said supporting unit having a multiplicity of elongated sockets extending normal to the cover plate and adapted to receive electrical resistance elements, having leads passing out of the ends of said sockets, a rotary switch having a multiplicity of fixed contacts arranged in a circle, said rotary switch being confined between said supporting unit and said cover plate and having an actuating shaft extending through the cover plate, a pointer handle carried by said shaft and located outside of the cover plate, the leads from said resistances extending directly to said fixed contacts whereby a minimum length of leads is required, and the resistances are housed and insulated from each other by said supporting unit.

2. In an electrical measuring instrument, the combination of a cover plate with an instrument movement carried on the rear side of the cover plate and having a pointer and dial visible through the plate, with a supporting unit of molded insulating material of generally circular shape, said supporting unit having a multiplicity of elongated sockets extending normal to the cover plate and adapted to receive electrical resistance elements, having leads passing out of the ends of said sockets, a rotary switch having a multiplicity of fixed contacts arranged in a circle, said rotary switch being confined between said supporting unit and said cover plate and having an actuating shaft extending through the cover plate, a pointer handle carried by said shaft and located outside of the cover plate, the leads from said resistances extending directly to said fixed contacts whereby a minimum length of leads is required, and the resistances are housed and insulated from each other by said supporting unit, the said fixed contacts being carried by arcuate integral strips which serve as connectors when the contacts are to be electrically connected, predetermined of the contacts being severed from said arcuate strip.

3. In an electrical measuring instrument, the combination of a cover plate with an instrument movement carried on the rear side of the cover plate and having a pointer and dial visible through the plate, with a supporting unit of molded insulating material of generally circular shape, said supporting unit having a multiplicity of elongated sockets extending normal to the cover plate and adapted to receive electrical resistance elements, having leads passing out of the ends of said sockets, a rotary switch having a multiplicity of fixed contacts arranged in a circle, said rotary switch being confined between said supporting unit and said cover plate and having an actuating shaft extending through the cover plate, a pointer handle carried by said shaft and located outside of the cover plate, the leads from said resistances extending directly to said fixed contacts whereby a minimum length of leads is required, and the resistances are housed and insulated from each other by said supporting unit, the said fixed contacts being carried by arcuate integral strips which serve as connectors when the contacts are to be electrically connected, predetermined of the contacts being severed from said arcuate strip, the said fixed contacts extending through an insulating wall of the rotary switch and being arranged circularly inside the rotary switch, and a rotor carried by said shaft and actuated thereby, said rotor carrying a movable contact for successively engaging said fixed contacts.

4. In an electrical instrument of the multiple scale type, the combination of an electrical instrument movement having a pointer and a dial plate provided with a plurality of scales, a plurality of electrical units comprising multiplier, shunts and resistances, to be connected in circuit with said movement to permit measurements corresponding to said scales, a rotary switch having a central shaft and a plurality of contacts for controlling the connection of said units to said movement, a housing enclosing said instrument, a cover for said housing and for supporting said movement, said cover having a window for exposing said scales and pointer, and said cover supporting said switch shaft, a pointer-handle on said shaft, said cover having indicia identifying said scales and arranged about said shaft adjacent the path of said pointer-handle, and a molded insulating supporting member for said units, said rotary switch having a plurality of fixed contacts arranged in a circle and said member having a plurality of elongated sockets for receiving said units and insulating the units from each other, and said sockets being arranged in a circle substantially concentric with the axis of said shaft, the sockets extending substantially parallel to said shaft and having one end open for insertion of said units, and a plurality of said resistance units being located in said sockets and having leads of minimum length connected directly to said fixed contacts.

HERBERT A. BERNREUTER.

REFERENCES CITED

The following references are of record in the file of this patent:

UNITED STATES PATENTS

| Number | Name | Date |
| --- | --- | --- |
| 1,593,024 | Macadie | July 20, 1926 |
| 1,674,688 | McCoy | June 26, 1928 |
| 1,949,634 | Simpson | Mar. 6, 1934 |
| 2,201,106 | Fox | May 14, 1940 |
| 2,286,029 | Van Beuren | June 9, 1942 |
| 2,429,592 | Beagles | Oct. 28, 1947 |

FOREIGN PATENTS

| Number | Country | Date |
| --- | --- | --- |
| 364,050 | Italy | Oct. 20, 1938 |